United States Patent [19] [11] Patent Number: 4,753,992
Umpleby [45] Date of Patent: Jun. 28, 1988

[54] POLYMER COMPOSITION

[75] Inventor: Jeffrey D. Umpleby, Ferney-Voltaire, France

[73] Assignee: BP Chemicals Limited

[21] Appl. No.: 868,255

[22] Filed: May 28, 1986

[30] Foreign Application Priority Data

Jun. 6, 1985 [GB] United Kingdom ............. 8514330

[51] Int. Cl.$^4$ ............................................. C08L 83/00
[52] U.S. Cl. ................................. 535/100; 525/195; 525/330.2
[58] Field of Search ............................... 525/100, 195

[56] References Cited

U.S. PATENT DOCUMENTS 3,792,124  2/1974  Davison et al. ................. 525/195
3,859,266  1/1975  Carlos et al. .................... 525/195
4,154,774  5/1979  Hinterwaldner ................ 525/195

Primary Examiner—Joseph L. Shofer
Assistant Examiner—Bernard Lipman
Attorney, Agent, or Firm—Brooks Haidt Haffner & Delahunty

[57] ABSTRACT

A crosslinkable composition comprising (A) a silyl polymer, for example an ethylene/vinyl trimethoxy silane copolymer, and (B) a silanol condensation catalyst which is an organic polymer having its polymer chains bridged by dihydrocarbyl tin (IV) containing units of the formula .O.SnR$^1$R$^2$O. Also disclosed are aliphatic alpha-olefin/unsaturated carboxyl compound copolymers containing similar dihydrocarbyl tin (IV) bridges. The compositions can be thermoformed into articles, e.g. cable insulation, and crosslinked by water treatment.

13 Claims, No Drawings

POLYMER COMPOSITION

The present invention relates to crosslinkable organic polymer compositions and to a novel tin-containing polymeric material suitable for use therein. More particularly the present invention is concerned with crosslinkable compositions comprising organic polymers containing hydrolysable silane groups, which polymers can be thermoformed into shaped articles, for example cable insulation or pipe, and subsequently crosslinked by contacting the articles with water or steam in the presence of a so-called "silanol condensation catalyst" comprising special tin-containing materials.

It is known that organic polymers containing hydrolysable silane groups can be crosslinked by the action of water, preferably in the presence of a silanol condensation catalyst. A number of methods are known for producing such crosslinkable organic polymers. One method comprises copolymerising unsaturated organic monomers with unsaturated silane compounds containing hydrolysable groups. Examples of this method are described in GB-A-2028831 and GB-A-2039513 which disclose the preparation of crosslinkable copolymers of ethylene and an ethylenically unsaturated silane compound by copolymerising the monomers at relatively high temperatures and pressures in the presence of a radical polymerisation initiator. Another example of this copolymerisation method is described in GB-A-1415194 which discloses the preparation of crosslinkable copolymer by contacting ethylene and a terminally unsaturated silane compound, optionally with other olefinically unsaturated comonomer, with certain defined Ziegler catalysts under polymerisation conditions which preferably employ relatively low temperatures and pressures.

It is also well-known that polymers crosslinkable by the action of water and a silanol condensation catalyst can be prepared by grafting an unsaturated silane compound on to preformed polymeric materials. Grafting processes of this type can be carried out by heating together a base polymer, for example polyethylene, an unsaturated silane compound bearing one or more hydrolysable groups, a grafting initiator and optionally a silanol condensation catalyst, under conditions such that the unsaturated silane compound is grafted on to the base polymer. Examples of this method are disclosed in GB-A-1357549, GB-A-1234034 and GB-A-1286460. Examples of commercial processes which employ a grafting reaction of this type are the SIOPLAS (RTM) and the MONOSIL (RTM) processes. In the SIOPLAS process, the base polymer is heated with the unsaturated silane in the presence of an organic peroxide grafting initiator to produce a silane-grafted thermoplastic polymer which is extruded and pelletized. The pelleted polymer can then be fed with a silanol condensation catalyst to a thermoforming process for fabricating shaped products. The shaped products can be crosslinked by exposure to water or steam. In the MONOSIL process, the base polymer, the unsaturated silane, the grafting catalysts and the silanol condensation catalyst are fed simultaneously to a special extruder in which grafting occurs "in situ" and crosslinkable products eg cable or pipe, are directly extruded. These products can be crosslinked by exposure to steam or water.

Other known methods for forming polymeric materials having hydrolysable silane groups include "ester exchange" methods wherein a copolymer having exchangeable functions such as alkoxy groups (as in ethylene/ethyl acrylate copolymer) or carboxylate groups (as in ethylene/vinyl acetate copolymer) is treated with a suitable silane compound in the presence of a special ester exchange catalyst.

In this method, for example, the alkoxy group present in an ethylene/alkyl(meth)acrylate copolymer can be "ester exchanged" (i.e. replaced by a silane substituent bearing hydrolysable groups) by reacting the copolymer with a suitable silane compound in the presence of a catalyst (for example, titanium tetraisopropylate). Examples of suitable silane compounds are acetoxy propyl trimethoxy silane, acetoxy propyl triethoxy silane, methacryloxypropyl trimethoxy silane, acryloxypropyl trimethoxy silane, methacryloxypropyl triethoxysilane and acryloxypropyl triethoxy silane. Another transesterification method comprises reacting an ethylene/vinyl acetate copolymer with a suitable silane compound bearing hydrolysable groups and having esterified carboxylic acid groups which exchange with the acetate groups on the copolymer. A suitable silane compound for use in this method is 4-[tri(m)ethoxysilyl]butanoic acid (m)ethyl ester.

Crosslinkable organic polymers having hydrolysable silane groups (hereinafter referred to as "silyl polymers") can be fabricated to form a large variety of useful articles by conventional techniques, for example, extrusion, injection moulding, blow-moulding and film-blowing processes. The crosslinking step is generally carried out subsequent to fabrication of the article because the crosslinked polymer cannot in general be satisfactorily thermoformed.

A problem encountered with silyl polymers is that during thermoforming operations the polymer can undergo premature crosslinking (also known in the art as "scorching") and this can lead to difficulties in the fabrication of articles from the polymer or to the production of articles having unsatisfactory physical and mechanical properties. This problem is particularly severe when the silanol condensation catalyst is included in the polymer prior to or during the thermoforming.

One method of reducing premature crosslinking proposed in GB-A-1357549 is to mould or extrude articles from silyl polymers in the absence of the silanol condensation catalyst and then to contact the produced article with an aqueous dispersion or solution of a tin carboxylate to cause the crosslinking. However, in many applications it is preferred to include the silanol condensation catalyst as a component of the polymer composition because this leads in general to higher crosslinking rates and to more complete crosslinking particularly in articles having thick cross section.

An object of the present invention is to provide an improved crosslinkable silyl polymer composition. It is a further object of the present invention to provide a novel tin-containing polymeric material suitable for use as a silanol condensation catalyst in the crosslinkable silyl polymer composition.

Accordingly, the present invention provides a crosslinkable composition comprising:
(A) a silyl polymer and
(B) a silanol condensation catalyst comprising a tin-containing polymeric material having organic polymer chains bridged intermolecularly and/or intra-molecularly by tin-containing bridges comprising the unit:

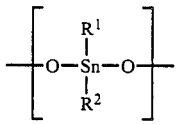

wherein $R^1$ and $R^2$ are the same or different hydrocarbyl groups.

The groups $R^1$ and $R^2$ are hydrocarbyl groups which suitably contain 1-20, preferably 2-8 carbon atoms. Examples of such groups are methyl, ethyl, n-propyl, isopropyl, n-butyl, n-hexyl, n-octyl, ethylhexyl, cyclohexyl, phenyl and tolyl.

The tin-containing bridges preferably form part of larger bridge units having the general formula

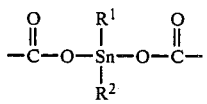

The carboxyl (—CO.O—) groups attached to the $Sn^{IV}$ in the above recited general formula are preferably the "pendant" carboxyls of units of (co)polymerised unsaturated carboxylic acid or ester, the latter units constituting units of organic polymer chains which are bridged to one another by the tin-containing bridges.

The bridge units can intermolecularly bridge separate polymer molecules and/or can be present intra-molecularly in single polymer molecules to form cyclic linkages.

The polymer chains present in the tin-containing polymeric material can be derived from, for example, polymerised olefins, vinyl esters, unsaturated carboxylic acids, esters of unsaturated carboxylic acids or copolymers of two or more such monomers. Preferred polymeric chains are those derived from unsaturated carboxylic acid acids or their esters, for example acrylic acid, ethyl acrylate, butyl acrylate, ethyl-methacrylate or butyl methacrylate, or from mixtures of the aforementioned esters with 1-olefins. Particularly preferred tin-containing polymeric materials are the "Sn-copolymers" of the present invention (described hereinafter), especially those prepared from ethylene/acrylic acid, ethylene/ethyl acrylate and ethylene/butyl acrylate copolymers.

Polymeric materials comprising tin-containing bridges of the type [O—SnR$^1$R$_2$—O] are known from the prior art. For example such polymeric materials suitable for use in the present invention are the polymers obtained by polymerising dialkyl stannylene dimethacrylates or by copolymerising such compounds with other monomers, for example, methyl methacrylate, styrene, acrylonitrile or cyclopentadiene. The preparation of these polymers is described for example in Journal of Polymer Science, Volume 52, pages 223-229.

Other methods for preparing polymeric material containing [O—SnR$^1$R$^2$—O] bridges include for example the reaction of a dialkyl tin oxide or a dialkyl tin diacetate with polymeric materials containing carboxylic acid groups or esterified carboxylic acid groups. Such carboxylic acid groups can be introduced into a polymer by well known grafting techniques or by polymerising or copolymerising unsaturated carboxylic acids or their esters. The copolymer or graft polymer containing the carboxylic acid groups or esterified carboxylic acid groups can then be reacted with a reactive dihydrocarbyl tin(IV) compound, for example dibutyl tin oxide or dibutyl tin diacetate, to provide a polymeric material wherein pairs of the pendant carboxyl groups in the copolymer or graft copolymer are bridged by the [O—SnR$^1$R$^2$—O] units.

The polymeric material containing the defined tin bridges preferably has an average molecular weight in the range 1000 to 150,000, most preferably 1500 to 75000. The quantity of tin present in the polymeric material is suitably in the range 1 to 42 weight percent, preferably in the range 1-25 weight percent, most preferably in the range 5 to 20 weight%.

The silyl polymer employed in the composition of the present invention is suitably any organic polymer containing hydrolysable silane groups which is crosslinkable by the action of water in the presence of a silanol condensation catalyst. Examples of such silyl polymers and references to their methods of manufacture are described above. Preferred silyl polymers are those prepared by copolymerising ethylene and an unsaturated silane compound having one or more hydrolysable groups, optionally together with one or more other monomers copolymerisable therewith, or those prepared by grafting an unsaturated silane on to a base polymer in the presence of a grafting initiator. The unsaturated silane compound employed in such processes is preferably a compound having the general formula $R^4SiR^5{}_nY_{3-n}$ wherein $R^4$ represents an ethylenically unsaturated hydrocarbyl or hydrocarbyloxy group; $R^5$ represents an aliphatic saturated hydrocarbyl group; Y represents a hydrolysable organic group; and n represents zero, 1 or 2. $R^4$ can be, for example, vinyl, allyl, isopropenyl, butenyl, cyclohexenyl or gamma-methacryloxypropyl. Y can be, for example, methoxy, ethoxy, formyloxy, acetoxy, propionyloxy, alkylamino or arylamino. $R^5$ can be, for example, methyl, ethyl, propyl, hexyl, octyl, decyl or phenyl. $R^4$ is preferably a vinyl group, Y is preferably methoxy, ethoxy or acetoxy. Preferred unsaturated silane compounds are vinyl trimethoxy silane, vinyl triethoxy silane and vinyl triacetoxy silane.

The silyl polymer suitably contains 0.1-10 weight %, preferably 0.5 to 5 weight % of copolymerised or grafted units of the unsaturated silane compound (based on silyl polymer).

The quantity of the tin-containing polymeric material employed in the composition of the present invention is suitably sufficient to provide 0.001 to 3.0, preferably 0.003 to 0.05 gramme atoms of tin per mole of silyl units in the silyl polymer. Generally speaking, the quantity of the tin compound is in the range 0.001 to 10% by weight, preferably 0.01 to 5% by weight, for example, 0.03 to 3% by weight based on the weight of the silyl polymer in the composition.

The present invention further provides a novel tin-modified copolymer of an aliphatic alpha-olefin and an unsaturated carboxyl compound wherein at least some of the carboxyl carbon atoms in the tin-modified copolymer are linked together intermolecularly and/or intramolecularly by bridges comprising the unit

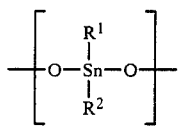

$R^1$ and $R^2$ being the same or different hydrocarbyl groups containing 1–20, preferably 1 to 8 carbon atoms and wherein the tin-modified copolymer is substantially free from carboxylic acid (—COOH) groups.

The bridges present in the tin-modified copolymer of the present invention preferably bridge the carboxyl carbon atoms in accordance with the unit formula

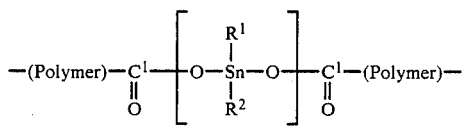

wherein $C^1$ represents the carboxyl carbon atoms of the copolymerised unsaturated carboxyl compound.

The novel tin modified copolymer of the present invention can be prepared by a process comprising reacting a copolymer of (1) an aliphatic alpha-olefin and (2) an ethylenically unsaturated organic carboxylic acid or ester thereof having the general formula $CH_2 = CR^6 - COOR^7$, with (3) a tetravalent dihydrocarbyl tin oxide compound having the general formula $R^1R^2SnO$ and removing the by-product water or ether, wherein $R^1$ and $R^2$ are as defined above and $R^6$ and $R^7$ are the same or different substituents selected from hydrogen and $C_1$ to $C_8$ alkyl groups.

The novel tin modified copolymer of the present invention is hereinafter referred to as "Sn-copolymer".

The aliphatic alpha-olefin (1) in the "Sn-copolymer" of the present invention preferably contains 1–12 carbon atoms and can be for example ethylene, propylene or butene-1. Preferably it is ethylene. The ethylenically unsaturated organic carboxylic acid or ester (2) can be, for example, acrylic acid, methacrylic acid, or methyl, ethyl, n-propyl or n-butyl esters of these carboxylic acids. Preferably the compound (2) is acrylic acid. Copolymers of aliphatic alpha-olefins and ethylenically unsaturated carboxyl compounds are well known in the art. These copolymers can be made for example by copolymerising the monomers using a free radical initiator at temperatures in the range 150°–350° C. and at pressures of 1000–4000 bars. Such copolymers can be suitably employed for use in the preparation of the "Sn-copolymer" of the present invention.

Examples of the tin compound (3) employed in the process of the present invention for making the "Sn-copolymer" are diethyl tin oxide, dipropyl tin oxide and di-n-butyl tin oxide.

The reaction between the copolymer (of the aliphatic alpha-olefin and the ethylenically unsaturated carboxyl compound) and the dihydrocarbyl tin oxide is preferably carried out by dissolving the copolymer in a suitable inert solvent, for example toluene or xylene, at elevated temperature if necessary, and adding the dihydrocarbyl tin oxide, preferably in solution. The reaction mixture is preferably heated under solvent reflux until the reaction is essentially complete.

The quantity of dihydrocarbyl tin oxide employed in the process for making the "Sn-copolymer" is suitably from 0.01 to 0.6 moles per mole of carboxyl groups present in the starting copolymer. In the case that the starting copolymer is an olefin/unsaturated carboxylic acid copolymer, it is preferred to use at least 0.5 moles of the dihydrocarbyl tin compound per mole of carboxylic acid groups in order to avoid leaving unreacted carboxylic acid groups in the product.

The byproduct water or ether obtained from the reaction can be separated from the product by conventional means, e.g. distillation.

The "Sn-copolymer" of the present invention preferably has an average molecular weight in the range 1000 to 150,000, most preferably 1500 to 75,000. The quantity of tin present in the "Sn-copolymer" is suitably in the range 1 to 25 weight%, preferably in the range 5 to 20 weight%.

The composition of the present invention can contain additives conventionally employed in the art. Examples of such additives are antioxidants, fillers, metal deactivators (e.g. salicylaldehyde oximes) lubricants, water-tree inhibitors, foaming agents, flame retardants and pigments. Additives of this type are conventionally incorporated into the composition either directly or by a masterbatching technique. The composition can also be blended with other compatible polymeric materials, for example, polyethylene, polypropylene, ethylene/ethyl acrylate copolymer and ethylene/1-olefin copolymer (e.g. LLDPE).

The composition of the present invention can be used to manufacture crosslinked products using the technology known in the manufacture of articles from conventional silane grafted polymers or silyl copolymers of this type. For example, the composition can be use in blow-moulding, injection-moulding, film-blowing, calendering, extrusion, roto-moulding and extrusion-coating techniques. The composition is particularly preferred for wire and cable coating applications. Wire and cable insulation produced by extrusion coating using the composition of the present invention exhibits improved surface finish.

The polymeric silanol condensation catalyst employed in the composition of the present invention generally exhibits good compatibility in the preparation of polymeric masterbatches. The composition of the present invention possesses good storage stability ("shelf-life").

The composition of the present invention can be prepared by blending together the components (A) the silyl polymer and (B) the defined silanol condensation catalyst under conditions such that a homogeneous mixture is obtained. If desired, the silanol condensation catalyst can be added as a masterbatch in a polymer material compatible with the silyl polymer, for example low density polyethylene or ethylene ethyl acrylate copolymer. The blending can be carried out for example in conventional polymer homogenising or compounding apparatus, for example in an extruder or a Brabender mixer. The silyl polymer can be employed as such, or as a precursor of the silyl polymer comprising for example, base polymer (e.g. polyethylene or ethylene copolymer), unsaturated silane monomer and grafting initiator (e.g. peroxide).

Articles fabricated from the composition of the present invention can be readily crosslinked by exposure to water, steam or moist air and, in general, relatively fast rates of cure are obtained. The polymeric silanol condensation catalyst employed in the present invention is generally less easily leached from the composition by the action of water than is the case with conventional silanol condensation catalyst.

The invention is illustrated in the following Examples.

SYNTHESIS OF POLY(DIBUTYLTINDI[ETHYLENE/ACRYLATE COPOLYMER])

Example 1

Into a two liter flask, equipped with a stirrer, a nitrogen inlet and a reflux column, are placed 81.1 g of an ethylene/acrylic acid copolymer (14.5%wt acrylic acid comonomer units, AC5120 from ALLIED CHEMICALS) and 500 ml of toluene. The flask is heated with stirring until the polymer passes into solution. A solution of dibutyltin oxide (Janssen, 20.5 g in 200 ml toluene) is slowly added.

The contents of the flask are heated under reflux for one hour after which the water/toluene azeotrope is distilled and collected. The toluene solvent is subsequently distilled off under reduced pressure, affording a crude white compound (in accordance with the novel "Sn-copolymer" of the present invention) which is recrystallised from toluene. The product is substantially free from free carboxylic acid groups.

Example 2

The reaction of Example 1 is repeated using dibutyltin oxide and ethylene acrylic acid copolymer (10.9%wt acrylic acid comonomer units, AC580 from ALLIED CHEMICALS) affording a polymer showing absence of free acid groups.

The reaction occurring in Examples 1 and 2 can be represented by the scheme:

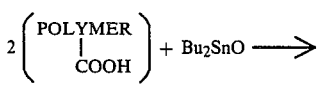

Formula A

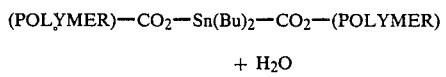

$+ H_2O$

In this scheme "POLYMER" represents a segment of the ethylene/acrylic acid chain bearing a carboxyl group.

CROSSLINKING OF SILANE MODIFIED POLYMERS

Examples 3, 4 and Comparative Test A

Masterbatches were prepared by compounding together the components (see Table 1) in a Werner and Pfleiderer ZSK 30 twin screw extruder at a screw speed of 200 revolutions per minute. The total quantity of composition prepared in each Example and in the Test was 10 Kg per run. The extruder temperature was about 140° C. close to the hopper zone, increasing to 190° C. at the extruder head. Extrusion was carried out to give a strand which was chopped to give a pelleted masterbatch.

The pelleted masterbatch (5 parts by weight) was dry blended with 95 parts by weight of a silyl modified polymer prepared by copolymerising ethylene wtih vinyl trimethoxy silane under high temperature and high pressure conditions using a free radical initiator. The silyl modified polymer contained 1.8 weight % of copolymerised vinyl trimethoxy silane, had a melt index (190° C., 2.16 Kg load) of 0.7 and a density of 923 Kg/m³.

The dry blend was fed into the hopper of a Gottfert extruder equipped with a 25 mm screw having L:D of 23:1 and a 5 cm slot-casting die having a 3 mm die gap to produce an extruded tape. The die temperature was 210° C. and the screw speed was 40 RPM. The extrudate was collected on a conveyor belt moving at a rate such that the tape thickness was maintained at 1.5±0.1 mm. The extruded tape was cured by immersion in a water bath thermostated at 80° C. Visual examination of the tapes produced using the composition of the present invention (i.e. Examples 3 and 4) showed that the tapes were relatively free from surface imperfections and defects caused by premature crosslinking (i.e. crosslinking during extrusion). Tape having similar characteristics continued to be extruded even after 1 hours extrusion time. On the other hand, tape produced from the composition of Comparative Test A exhibited substantial surface irregularity caused by premature crosslinking in the extruder. This surface irregularity is observed to continue even when addition of the catalyst masterbatch of Comparative Test A has been stopped, due to "sweat out" of the catalyst onto the screw or die.

Samples of the crosslinked extruded tapes were subjected to heat elongation testing according to IEC 540 (200° C., 20 g/mm², 15 minutes). The heat elongation figures are recorded in Table 2 for tapes cured for, respectively 1 hour, 3 hours, 5 hours and 8 hours.

TABLE 1

| Component | Parts by weight | | |
| --- | --- | --- | --- |
| | Example 3 | Example 4 | Comparative Test A |
| "Sn—copolymer P" | 1.9 | — | — |
| "Sn—copolymer Q" | — | 2.5 | — |
| Dibutyltin dilaurate (Sn content 18.5%) | — | — | 1.0 |
| Antioxidant | 5.0 | 5.0 | 5.0 |
| Slip Agent | 1.0 | 1.0 | 1.0 |
| Low density PE | 92.1 | 91.5 | 93.0 |

TABLE 2

| | % Elongation after cure in 80° C. water | | | |
| --- | --- | --- | --- | --- |
| | 1 hr | 3 hr | 5 hr | 8 hr |
| Example 3 | 300 (br) | 200 (br) | 120 | 75 |
| Example 4 | 300 (br) | 200 (br) | 100 | 70 |
| Comparative Test A | 150 | 60 | 45 | 45 | br = sample breaks.

A further unexpected advantage of Examples 3 and 4 was the excellent compatibility of the tin catalysts with the silane modified polymer. When a catalyst is not totally compatible under extrusion conditions, then it will "sweat out" or "plate out" in the extruder barrel or die and form stagnated catalyst pockets which can cause irregular polymer flow and/or premature crosslinking and screw/die fouling. These stagnated pockets are extremely difficult to flush out of the extrusion equipment and normally require the extruder to be stopped, stripped down and polished. The catalysts in Examples 3 and 4 showed no tendency to "sweat out" and thus enabling lengthy extrusion periods with reduced cleaning times.

"Sn-copolymer P" was a copolymer prepared by bridging the carboxylic acid groups in the commercially available ethylene acrylic acid copolymer AC5120 (Allied Chemicals) with —Sn(IV)Bu₂— units so that the carboxylic acid groups are bridged as shown in Formula A.

"Sn-copolymer P" contained 10% by weight of Sn, was substantially free from carboxylic acid groups and showed a strong infra red absorption band at 1590 cm$^{-1}$ corresponding to the tin carboxylate absorption band.

"Sn-copolymer Q" was similar to "Sn-copolymer P" except that the former was prepared from the commercially available copolymer AC580 (Allied Chemicals) and contained about 7% of tin (by weight).

I claim:

1. A crosslinkable composition comprising:
   (A) a silyl polymer which is an organic polymer containing hydrolysable silane groups and is crosslinkable by the action of water in the presence of a silanol condensation catalyst and
   (B) a silanol condensation catalyst comprising a tin-containing polymer material having organic polymer chains bridged intermolecularly and/or intramolecularly by tin-containing bridges comprising the unit:

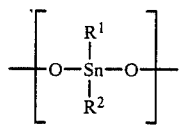

wherein R$^1$ and R$^2$ are the same or different hydrocarbyl groups,
   said polymeric material of (B) containing the tin bridges being derived from the group consisting of polymerised olefins, vinyl esters, unsaturated carboxylic acids, esters of unsaturated carboxylic acids and copolymers of two or more such monomers and having an average molecular weight in the range 1000 to 150,000, and the quantity of tin present in the polymeric material being in the range 1 to 42 weight percent, and
   The quantity of the tin-containing polymeric material of (B) being sufficient to provide 0.001 to 3.0 gramme atoms of tin per mole of silyl units in the silyl polymer.

2. A crosslinkable composition as claimed in claim 1 wherein the tin-containing bridges form part of larger bridge units having the general formula

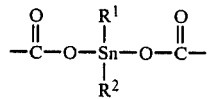

3. A crosslinkable composition as claimed in claim 2 wherein the carboxyl groups attached to the tin atom are the carboxyl groups of units of polymerised or copolymerised unsaturated carboxylic acid or ester.

4. A crosslinkable composition as claimed in claim 3 wherein the organic polymer chains are based on ethylene/acrylic acid, ethylene/ethyl acrylate or ethylene/butyl acrylate copolymers.

5. A crosslinkable composition as claimed in claim 1 wherein the silyl polymer is a copolymer of ethylene with an unsaturated silane compound having one or more hydrolysable groups.

6. A crosslinkable composition as claimed in claim 1 wherein the silyl polymer is prepared by heating together a base polymer, an unsaturated silane compound bearing one or more hydrolysable groups and a grafting initiator under conditions such that the unsaturated silane compound is grafted on to the base polymer.

7. A crosslinkable composition as claimed in claim 5 wherein the unsaturated silane compound is selected from vinyl trimethoxy silane, vinyl triethoxy silane and vinyl triacetoxy silane, said copolymer containing 0.5 to 5 weight percent of units of the silane.

8. A crosslinkable composition as claimed in claim 1, wherein the quantity of tin present in the polymeric material is in the range 1-25 weight percent.

9. A crosslinkable composition as claimed in claim 1 in which the polymeric material of (B) containing the tin bridges is derived from the group consisting of acrylic acid, ethyl acrylate, butyl acrylate, ethyl methacrylate, butyl methacrylate and mixtures of the aforementioned esters with 1-olefins.

10. A crosslinkable composition as claimed in claim 1 in which the tin-containing polymeric material (B) is a tin-modified copolymer of an aliphatic alpha-olefin and an unsaturated carboxyl compound wherein at least some of the carboxyl carbon atoms in the tin-modified copolymer are linked together intermolecularly and/or intramolecularly by bridges comprising the unit

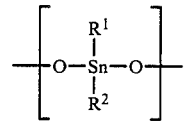

R$^1$ and R$^2$ being the same or different hydrocarbyl groups containing 1 to 20 carbon atoms and wherein the tin modified copolymer is substantially free from carboxylic acid groups.

11. A crosslinkable composition as claimed in claim 10 in which the bridges are present in the copolymer in accordance with the unit formula:

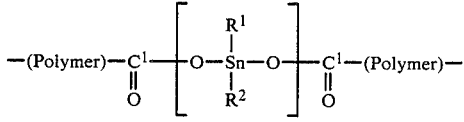

12. A crosslinkable composition as claimed in claim 10 wherein the aliphatic olefin is ethylene and the unsaturated carboxyl compound is acrylic acid or methacrylic acid.

13. A crosslinkable composition as claimed in claim 11 wherein the aliphatic olefin is ethylene and the unsaturated carboxyl compound is acrylic acid or methacrylic acid.

* * * * *